(12) United States Patent
Wu et al.

(10) Patent No.: US 8,388,006 B2
(45) Date of Patent: Mar. 5, 2013

(54) MOTORIZED VEHICLE WITH FOLDABLE FRAME AND LOCKING MECHANISM

(75) Inventors: Chichun Wu, Dongguan (CN); Zhao Zhang, Dongguan (CN)

(73) Assignee: Chichun Wu, Dongguan, Guangdong Province (CN)

( * ) Notice: Subject to any disclaimer, the term of this patent is extended or adjusted under 35 U.S.C. 154(b) by 39 days.

(21) Appl. No.: 13/233,848

(22) Filed: Sep. 15, 2011

(65) Prior Publication Data
US 2012/0242059 A1 Sep. 27, 2012

(30) Foreign Application Priority Data

| Mar. 21, 2011 | (CN) | 2011 1 0067453 |
| Mar. 21, 2011 | (CN) | 2011 2 0074798 U |
| Mar. 21, 2011 | (CN) | 2011 2 0074811 U |
| May 4, 2011 | (CN) | 2011 2 0138218 U |

(51) Int. Cl.
*B62K 15/00* (2006.01)
(52) U.S. Cl. ...... 280/287; 280/278; 280/87.05; 280/87.021; 280/87.01; 180/208; 180/180; 180/181; 296/181.7
(58) Field of Classification Search ............ 280/287, 280/278, 87.05, 87.021, 87.01; 180/208, 180/180, 181; 296/181.7
See application file for complete search history.

(56) References Cited

U.S. PATENT DOCUMENTS

| 4,757,868 | A | * | 7/1988 | Cresswell | 180/11 |
| 5,312,126 | A | * | 5/1994 | Shortt et al. | 280/287 |
| 7,654,356 | B2 | * | 2/2010 | Wu | 180/208 |
| 7,770,913 | B2 | * | 8/2010 | Cannon | 280/656 |
| 7,926,606 | B2 | * | 4/2011 | Wang | 180/208 |
| 8,066,294 | B2 | * | 11/2011 | Tsai | 280/278 |

* cited by examiner

*Primary Examiner* — Tashiana Adams
*Assistant Examiner* — Marlon Arce
(74) *Attorney, Agent, or Firm* — Morris Manning & Martin LLP; Tim Tingkang Xia, Esq.

(57) ABSTRACT

A locking mechanism for a foldable motorized vehicle for locking a main frame body thereof comprises a pulling arm, locking shafts, shaft sleeves, elastic elements, and locking pins. The shaft sleeves are fixedly positioned in parallel below the main frame body and respectively sleeved on the locking shafts. Each of the locking pins is fixed on one end of a corresponding locking shaft and penetrates corresponding locking holes on the main frame body. Each elastic elements is sleeved on the corresponding locking shaft and pressing against the locking shaft and the corresponding shaft sleeve, respectively. The pulling arm comprises a pulling rod pivoted on one end of one locking shaft, and a connecting member with one end pivoted on one end of the other locking shaft, and the other end pivoted on the pulling rod.

24 Claims, 16 Drawing Sheets

MOTORIZED VEHICLE WITH FOLDABLE FRAME AND LOCKING MECHANISM

CROSS-REFERENCE TO RELATED APPLICATIONS

This application claims priority to and the benefit of, pursuant to 35 U.S.C. §119(a), Chinese Patent Application No. 201120074798.6, filed Mar. 21, 2011, Chinese Patent Application No. 201110067453.2, filed Mar. 21, 2011, Chinese Patent Application No. 201120074811.8, filed on Mar. 21, 2011, and Chinese Patent Application No. 201120138218.5, filed May 4, 2011. Each of the above applications is incorporated by reference herein in its entirety.

FIELD OF THE INVENTION

The present invention generally relates to a vehicle, and more particularly, to a foldable motorized vehicle having a foldable frame, a connecting mechanism and a locking mechanism.

BACKGROUND OF THE INVENTION

With the improvement of living standards, the life philosophy of being distinctive, fashionable, healthy, and environmentally friendly becomes popular, and fashionable and environmentally friendly articles for daily use and motorized vehicles are favored by more and more people. The Motorized Vehicles evolve from being only a means of transport to being a symbol of a fashionable and healthy lifestyle, and are a means for practicing environmental protection. Foldable Motorized Vehicle saves storage room and is easy to carry. The actual size of a folded motorized vehicle is dramatically reduced, making it possible to carry it up and down stairs, into and out of an elevator, into a bus or metro train. Furthermore, the Foldable Motorized Vehicle has a good appearance, and shows exquisite workmanship, thereby making it top choice of fashionable people.

However, in a conventional foldable vehicle, building a foldable frame is the key to making a functional foldable motorized vehicle. The foldable frame has a complex structure. making both folding and unfolding complicated and slow. The foldable frame should be designed so that after the frame is folded, the motorized vehicle is compact, small in size, light in weight, and strong enough to sustain folding and unfolding actions. Therefore, a novel foldable frame structure that is convenient to fold and unfold, of a more compact structure after being folded, small in size, light in weight, and convenient to carry becomes a new direction of research.

Therefore, a heretofore unaddressed need exists in the art to address the aforementioned deficiencies and inadequacies.

SUMMARY OF THE INVENTION

The present invention provides a foldable frame with a novel frame connecting mechanism and frame locking mechanism that has a simple yet novel structure, which is convenient to fold and unfold.

In one aspect, the present invention relates to a locking mechanism for a foldable motorized vehicle for locking a main frame body of the foldable motorized vehicle. In one embodiment, the locking mechanism for the foldable motorized vehicle includes: (a) a pulling arm, (b) a plurality of locking shafts, (c) a plurality of shaft sleeves, (d) a plurality of elastic elements, and (e) a plurality of locking pins, where the plurality of shaft sleeves is fixedly positioned in parallel below the main frame body, the plurality of shaft sleeves is respectively sleeved on the plurality of locking shafts, the main frame body comprises a plurality of locking holes, each of the plurality of locking pins is fixed on one end of a corresponding one of the plurality of locking shafts and penetrates the corresponding locking holes, the plurality of elastic elements is sleeved on the corresponding locking shaft, and has one end pressing against one end of the locking shaft and the other end pressing against a side surface of the corresponding shaft sleeve, respectively, the pulling arm comprises a pulling rod and a connecting member, one end of the pulling rod is pivoted on one end of one locking shaft, one end of the connecting member is pivoted on one end of the other locking shaft, and the other end of the connecting member is pivoted on the pulling rod.

In one embodiment, the locking shafts respectively have one fixing arm extending from a left side and a right side at one end, and the locking pins are respectively fixed on two ends of the fixing arm.

In one embodiment, the locking mechanism has a handle with a first side connecting member and a second side connecting member. Each of the first side connecting member and the second side connecting member connecting to tail ends of the pulling rod.

In one embodiment, a plurality of moving slots is respectively opened on side surfaces of the handle, and the tail ends of the pulling rod are movably connected to the plurality of moving slots.

In one embodiment, the plurality of elastic elements is compression spring.

In another aspect, the present invention relates to a foldable main frame body, mounted on a front wheel rack and a rear wheel rack of a foldable motorized vehicle. In one embodiment, the foldable main frame body includes: (a) a plurality of first upper levers, (b) a plurality of first lower levers, (c) a plurality of second upper levers, (d) a plurality of second lower levers, and (e) a plurality of pivoting members. In one embodiment, one end of each first upper lever and one end of each second upper lever respectively have a pivot joint, the pivot joints are respectively pivoted to two ends of upper side of one corresponding pivoting member, the other end of the first upper lever and the other end of the second upper lever are pivoted to the front wheel rack and the rear wheel rack, respectively, one end of the first lower lever and one end of the second lower lever are pivoted to two sides of lower end of the one corresponding pivoting member, respectively, the other end of the first lower lever and the other end of the second lower lever are pivoted to the front wheel rack and the rear wheel rack, respectively, the first lower lever is located below the first upper lever, the second lower lever is located below the second upper lever, each of the pivot joints has an arc-shaped edge, upper sides of the arc-shaped edges extend to form opposite protruding blocks, and when the main frame body is level, the protruding blocks press against each other.

In one embodiment, the foldable main frame body has a plurality of first transmission members and a plurality of second transmission members. Each of the first transmission members and the second transmission members is respectively fixed to the corresponding side of the pivot joints. Each of the first transmission members and each of the second transmission members has gear teeth. The gear teeth of the first transmission members are engage with gear teeth of the second transmission members, respectively.

In one embodiment, the foldable main frame body has a plurality of locking mechanisms. Each of the plurality of locking mechanisms has a locking hole and locking pin. The locking hole is formed on the transmission member. Two ends of a horizontal side of the pivoting member are formed with openings, and the locking pins pass through the openings and are inserted into the locking holes.

In one embodiment, the foldable main frame body has connecting members. One end of the connecting member is pivoted to the pivot joint of the first upper lever, and the other end of the connecting member is pivoted to the pivot joint of the second upper lever.

In one embodiment, the foldable main frame body includes a fastening mechanism. The fastening mechanism has a fastening wrench and an elastic element. The first lower lever is pivoted to the front wheel rack through a front pivot shaft. The second lower lever is pivoted to the rear wheel rack through a rear pivot shaft. The fastening wrench has a connecting portion. The upper end of the connecting portion is bent downwards and extends to form a fastening portion. The lower end of the connecting portion is bent upwards and extends to form a wrench. The connecting portion is sleeved over the rear pivot shaft, and the fastening portion is capable of being fastened to the front pivot shaft. The wrench presses against a rear axle of the rear wheel rack. One end of the elastic element is fixed to the connecting portion, and the other end of the elastic element is fixed to the rear wheel rack.

In one embodiment, the fastening portion is formed with a slot facing downwards, and the slot is capable of fastening the front pivot shaft.

In one embodiment, the front end of the fastening portion is formed with a chamfer facing downwards. The elastic element is a tension spring.

In yet another aspect, the present invention relates to a foldable main frame body of a foldable motorized vehicle. In one embodiment, the foldable main frame body has: (a) a plurality of first upper levers, (b) a plurality of first lower levers, (c) a plurality of second upper lever, (d) a plurality of second lower levers, (e) a front lever, (f) a rear lever, (g) a plurality of pivoting members, and (h) a plurality of linkage mechanisms.

In one embodiment, the front end of the first upper lever and the front end of the first lower lever are respectively pivoted to two ends of the front lever. The rear end of the first upper lever and the rear end of the first lower lever are respectively pivoted to an upper end and the lower end of the pivoting member. The front end of the second upper lever and the front end of the second lower lever are respectively pivoted to the upper end and the lower end of the pivoting member. The rear end of the second upper lever and the rear end of the second lower lever are respectively pivoted to two ends of the rear lever. The rear end surface of the first upper lever presses against the front end surface of the second upper lever when the folding frame is horizontally unfolded. The pivoted position of the front end of the second lower lever is bent upwards and extends to form the linkage portion. One end of the linkage mechanism is fixed to the first upper lever, and the other end of the linkage mechanism is pivoted to the tail end of the linkage portion.

In one embodiment, each of the plurality of the linkage mechanisms has a fixing member and a connecting member. The fixing member is fixed to the lower side of the rear end of the first upper lever. One end of the connecting member is pivoted to the fixing member, and the other end of the connecting member is pivoted to the tail end of the linkage portion.

In one embodiment, the bottom portion of the plurality of the first upper levers and the bottom portion of the plurality of the second upper levers are each formed with a groove. The grooves respectively accommodate the plurality of the first lower levers and the plurality of the second lower levers during folding, respectively. In one embodiment, an upper surface of each of the plurality of the second upper levers is formed with a through slot in communication with the groove, and the through slot accommodates the linkage portion of the plurality of the second lower levers during folding, respectively.

In one embodiment, each of the plurality of the pivoting members has an I-shaped structure, an upper end of the pivoting member is formed with an upper pivot hole, and the lower end of the pivoting member is formed with the lower pivot hole.

In one embodiment, one side below the rear end of the first upper lever and the other side below the front end of the second upper lever are formed with corresponding sleeves. A shaft pin passes through the upper pivot hole to pivot the sleeves, and another shaft pin passes through the lower pivot hole to pivot the first lower lever to the second lower lever.

In one embodiment, each of the plurality of the pivoting members has a T-shaped structure, each of two top ends of the pivoting member is respectively formed with an upper pivot hole, and the lower end of the pivoting member is formed with the lower pivot hole.

In one embodiment, the rear end of the first upper lever and the front end of the second upper lever respectively have pivot joints, shaft pins pass through the upper pivot holes to respectively pivot the pivot joints to the two top ends of the pivoting member, and another shaft pin passes through the lower pivot hole to pivot the first lower lever to the second lower lever.

In one aspect, the present invention relates to a foldable motorized vehicle comprising a locking mechanism and a foldable main frame as disclosed above.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE INVENTION

Figure 1:
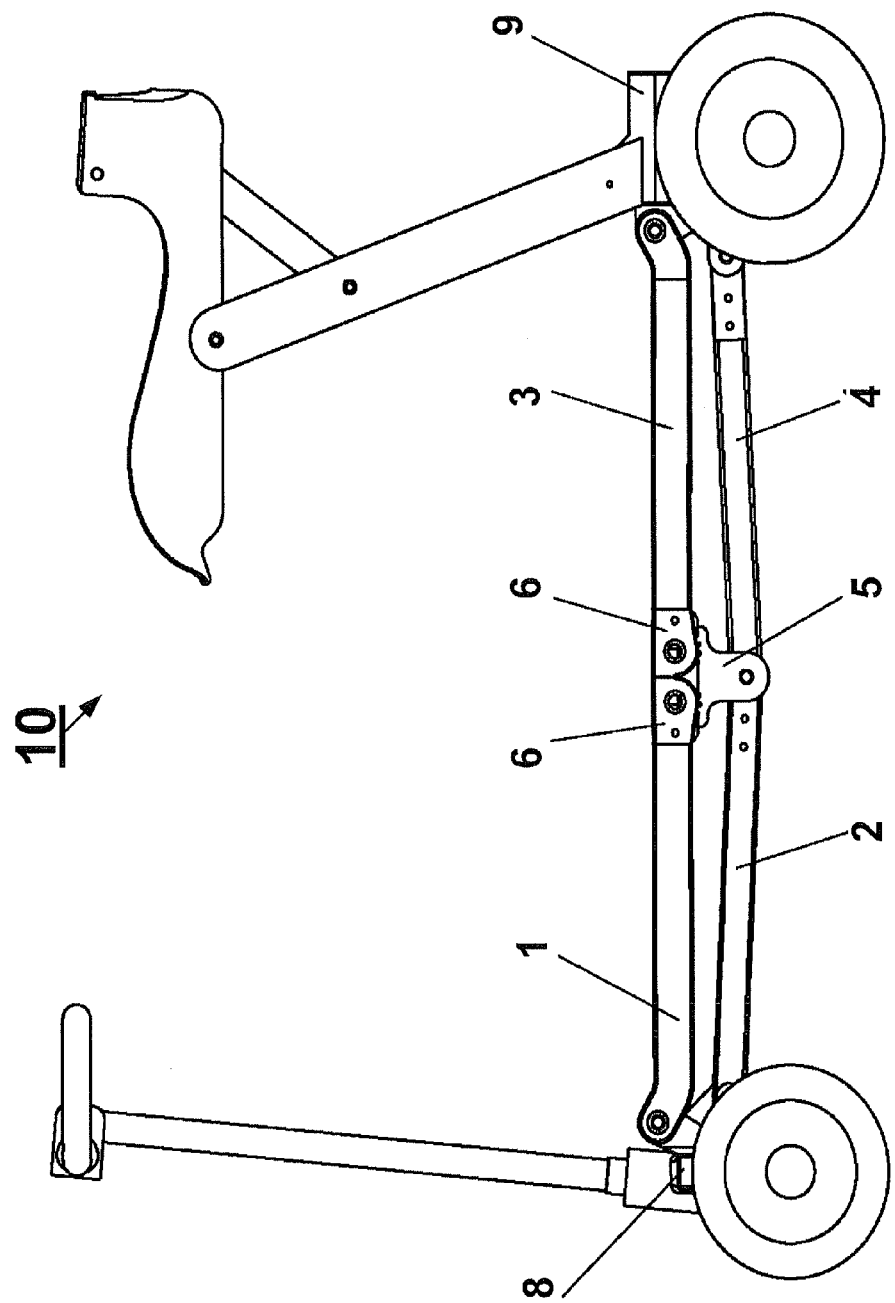
FIG. 1 illustrates a size view of an exemplary foldable motorized vehicle with a main frame body according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Prior to a detailed description of the present invention(s), the following definitions are provided as an aid to understanding the subject matter and terminology of aspects of the present invention(s), and not necessarily limiting of the present invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated. As used herein, the terms "comprising," "including," "having," "containing," "involving," and the like are to be understood to be open-ended, i.e., to mean including but not limited to.

Embodiments of the present invention are described below with reference to the accompanying drawings, and in the accompanying drawings like reference numerals represent like elements.

In FIG. 1, a side view of an exemplary main frame body 10 of a foldable motorized vehicle is shown according to one embodiment of the present invention is shown. The main frame body 10 of the foldable motorized vehicle includes: (a) a front end 8 of the main frame body, (b) a plurality of main frame body front cross bar 1 placed on each side of the front portion of the main frame body of the foldable motorized vehicle 10, (c) a plurality of main frame body rear cross bar 3 placed on each side of the rear portion of the main frame body of the foldable motorized vehicle 10, (d) a plurality of joint member 6 placed at the rear end of the main frame body front cross bar 1 and the front end of the main frame body rear cross bar 3, joining the main frame body front cross bar 1 and the main frame body rear cross bar 3, (e) a plurality of front supporting cross bar 2, (f) a plurality of rear supporting cross bar 4, (g) a plurality of joining member 5 joining the plurality of front supporting cross bar 2, the plurality of rear supporting cross bar 4, and the plurality of joint member 6, and (h) a rear end 9 of the main frame body 10. FIG. 1 illustrated an exemplary structure of main frame body of the foldable motorized vehicle.

Figure 2:
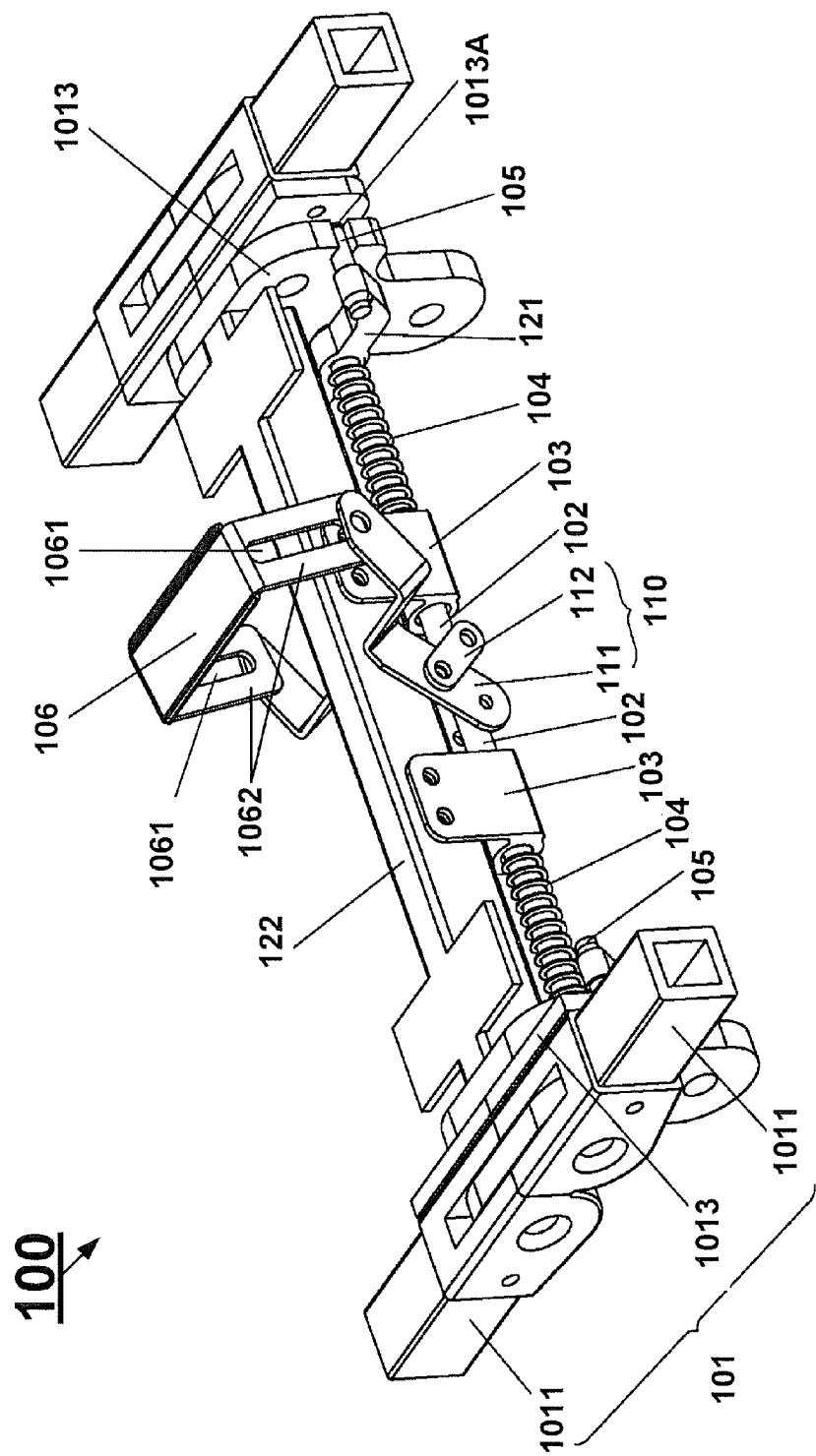
FIG. 2 shows a perspective structural view of a frame locking mechanism according to one embodiment of the present invention.
Figure 3:
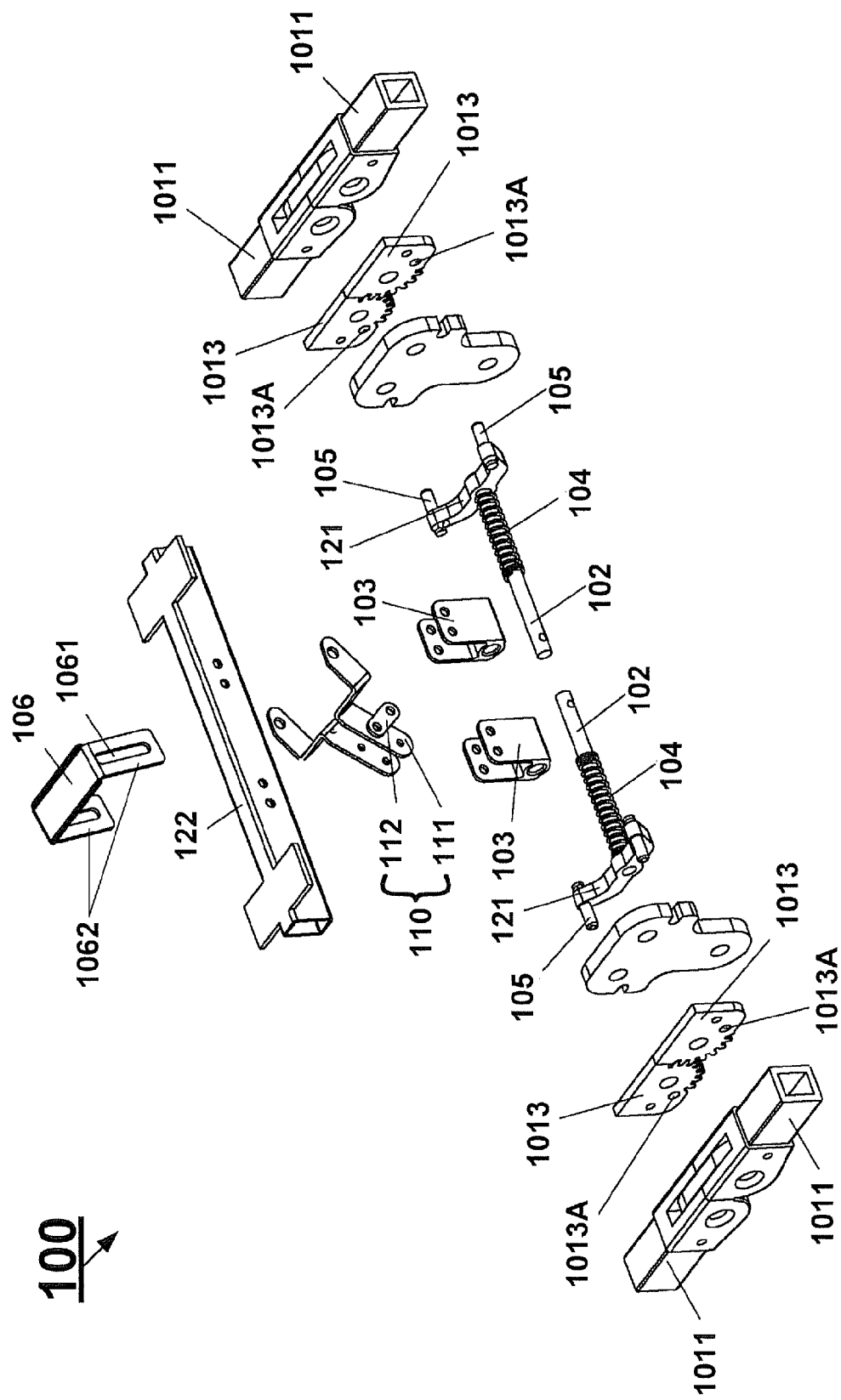
FIG. 3 shows an exploded structural view of a frame locking mechanism according to one embodiment of the present invention.

Referring to FIG. 2 and FIG. 3, a main frame body locking mechanism 100 of the present invention is mounted in a main frame body 101. The main frame body 100 respectively has one front cross bar 1011 on both sides, and one rear cross bar 1011 on both ides. The front and rear cross bars 1011 are interconnected through a connecting rod 122. A transmission member 1013 engaged with each other is fixed on the cross bar 1011, and locking holes 1013A are opened in the transmission member 1013. The main frame body locking mechanism 100 includes a pulling arm 11010, two locking shafts 102, two shaft sleeves 103, two compression springs 104, four locking pins 105, and a handle 106. The shaft sleeves 103 are fixed in parallel below the connecting rod 122. The shaft sleeves 103 are sleeved on the two locking shafts 102 respectively. A fixing arm 121 respectively extends from a left side and a right side at one end of the locking shafts 102. The locking pins 105 are respectively fixed on two ends of the fixing arms 121, and penetrate the locking holes 1013A. The locking pins 105 penetrate the locking holes 1013A on the transmission members 1013 that are engaged with each other at the same time, so as to lock the main frame body 101, and thus the main frame body 101 becomes firmer and more stable when it is unfolded. The compression spring 104 is fitted on the corresponding locking shaft 102, and has one end pressing against the fixing arm 121 at one end of the locking shaft 102 and the other end pressing against a side surface of the corresponding shaft sleeve 103. The pulling arm 110 includes a pulling rod 1111 and a connecting member 112. One end of the pulling rod 1111 is pivoted on one end of a locking shaft 102. One end of the connecting member 112 is pivoted on one end of the other locking shaft 102, and the other end of the connecting member 112 is pivoted on the pulling rod 111. Moving slots 1061 are opened on side surfaces 1062 of the handle 106, tail ends of the pulling rod 111 are movably connected to the moving slots 1061 through bolts or rivets, and the handle 106 can move up and down within the length of the moving slots 1061. When the handle 106 is pulled, the handle 106 may be lifted to a certain height and then pulls the pulling rod 111, which provides certain space to accommodate the hand of the operator, thereby facilitating the operation.

Figure 4:
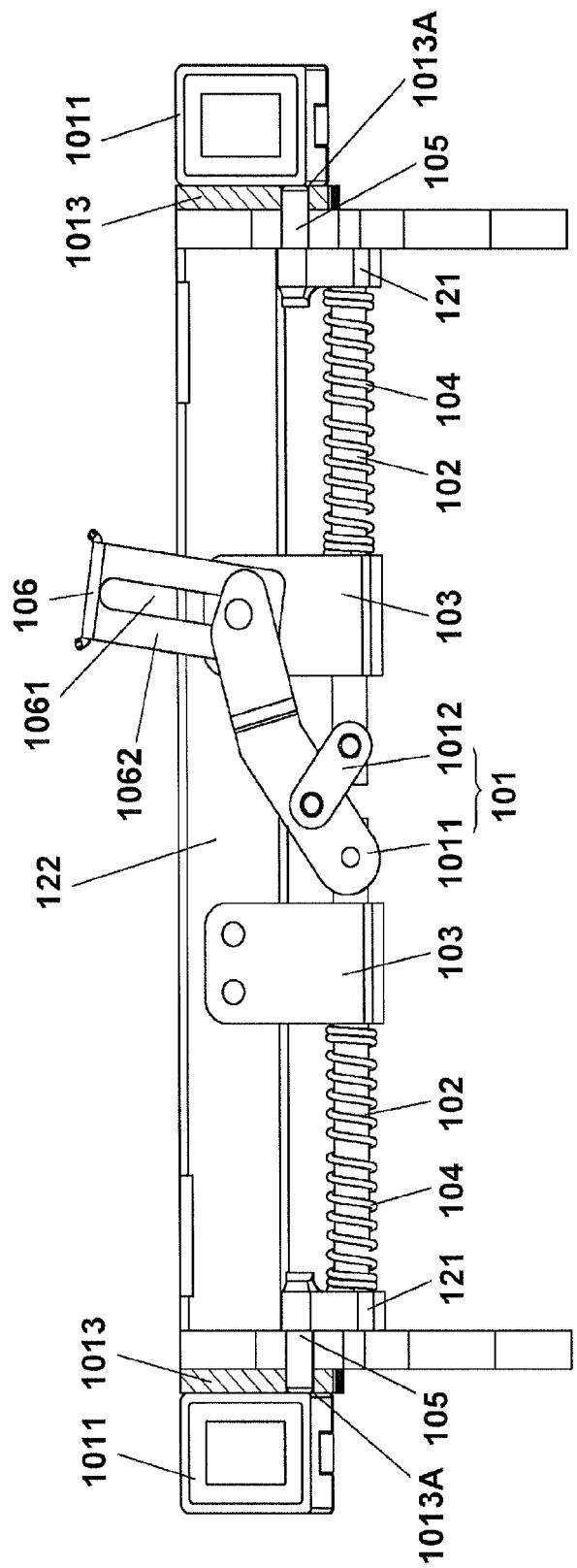
FIG. 4 is a sectional view of the frame locking mechanism when the main frame body is in locked condition according to one embodiment of the present invention.
Figure 5:
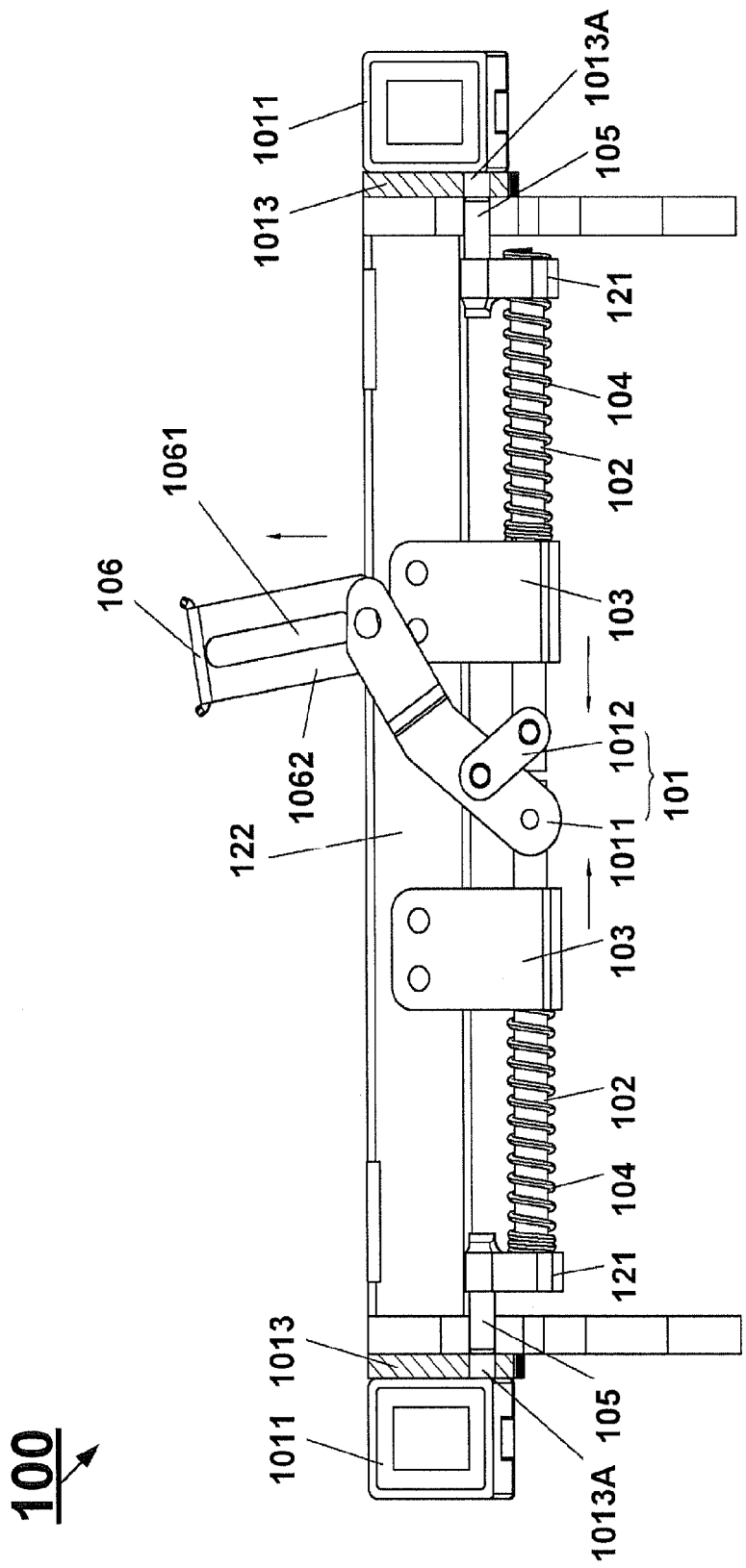
FIG. 5 is a sectional view of the frame locking mechanism when the main frame body is in unlocked condition according to one embodiment of the present invention.
Figure 6:
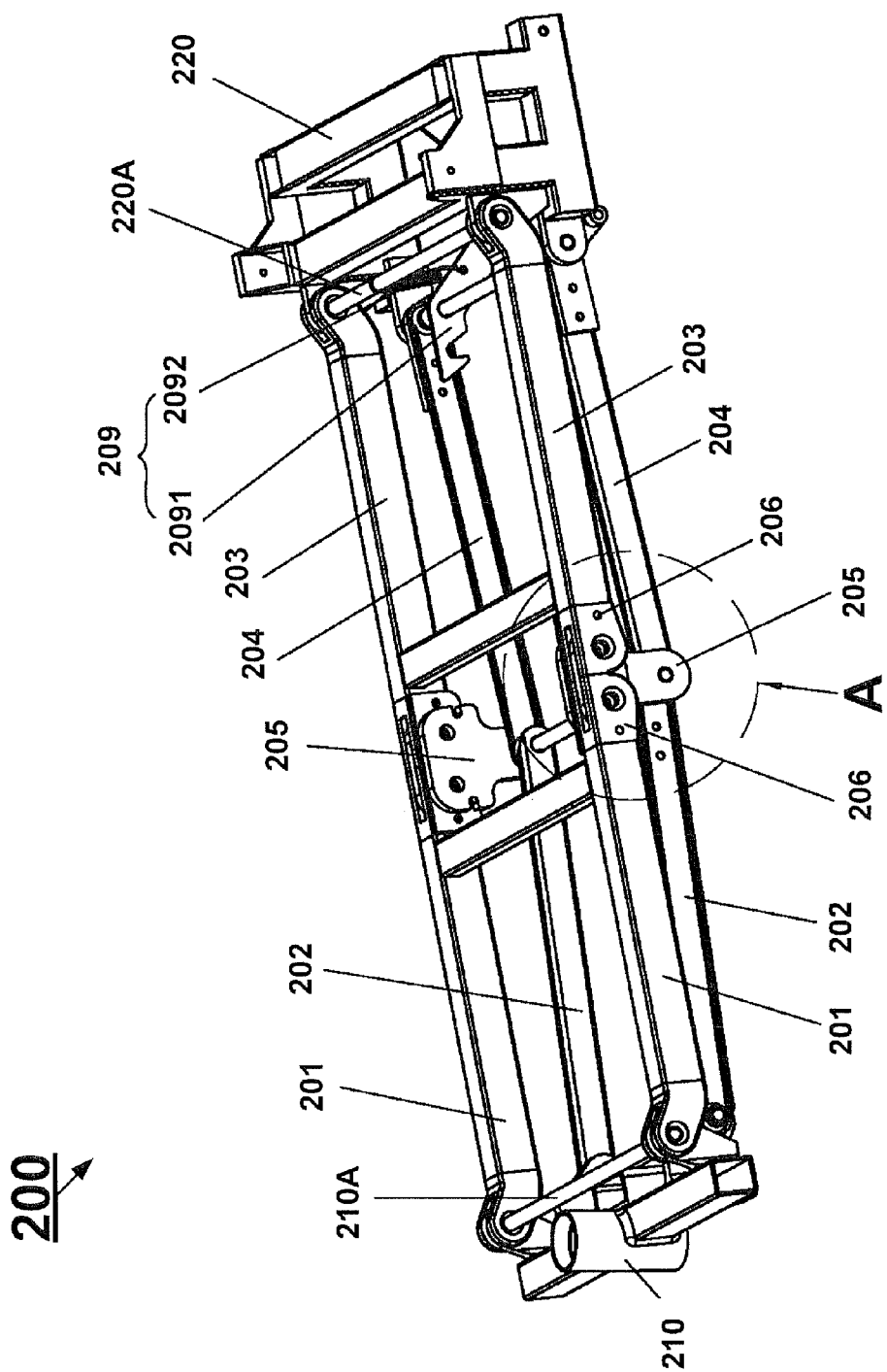
FIG. 6 shows a perspective structural view of a foldable main frame body of an exemplary foldable motorized vehicle when it is in unfolded position according to one embodiment of the present invention.
Figure 7:
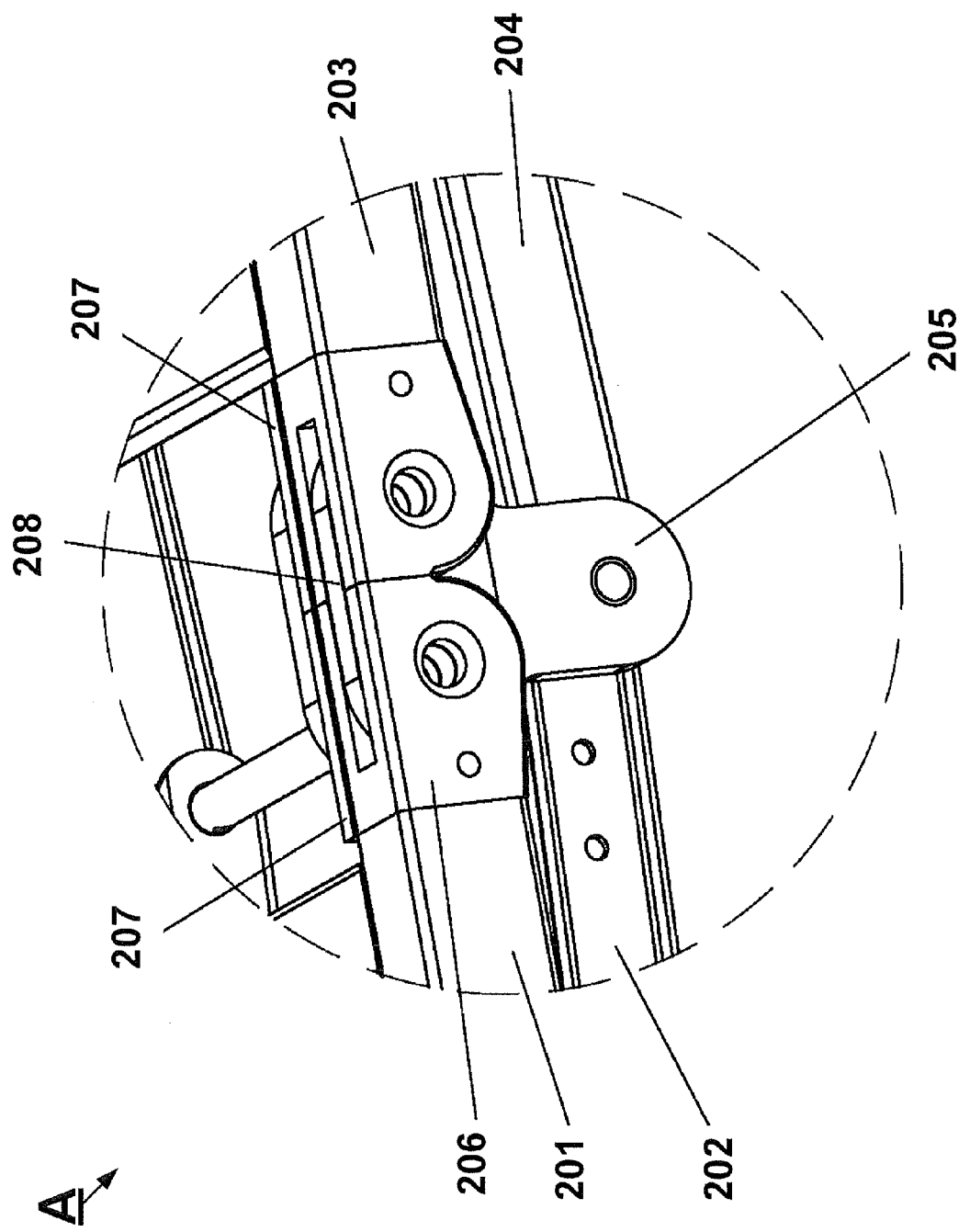
FIG. 7 is an enlarged view of portion A as shown in FIG. 6.
Figure 8:
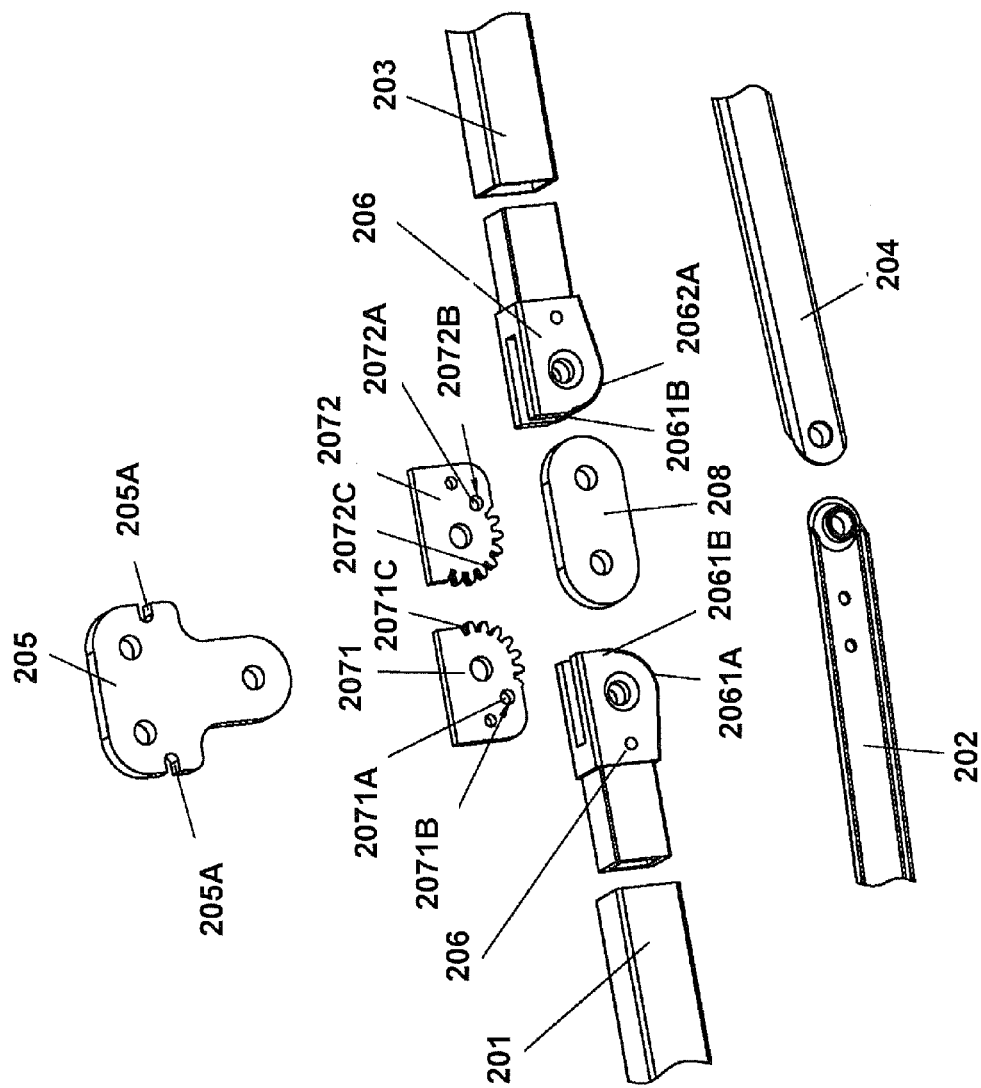
FIG. 8 is an exploded view of portion A as shown in FIG. 6.

In view of the above and further referring to FIG. 4 and FIG. 5, the working principle of the main frame body locking mechanism 100 is described in detail below. In one embodiment, FIG. 4 shows a sectional view of the frame locking mechanism when the main frame body 101 is in locked condition and FIG. 5 is a sectional view of the frame locking mechanism when the main frame body is in unlocked condition.

When the main frame body 101 is unfolded, the compression springs 104 push the locking shafts 102 to make the locking pins 105 press against side surfaces of the transmission members 1013. When the two cross bars 1011 on the two sides are opened to be in a horizontal state, under the effect of the compression springs 104, the locking pins 105 automatically penetrate the locking holes 1013A. When side surfaces of the fixing arms 21 respectively press against side surfaces of the main frame body 101, the locking pins 105 stop moving, and lock the two transmission members 1013, so as to lock the two cross bars 1011. At this time, the main frame body 101 is completely unfolded and is in a locked state. When the main frame body 101 is folded, the handle 106 is pulled manually to be lifted. When bottom ends of the moving slots 1061 of the handle 106 press against the rivets or bolts connecting the pulling rod 111, the handle 106 drives the pulling rod 111 to move upward, and meanwhile the pulling rod 111 drives the connecting member 112 to move upward. At this time, lower ends of the pulling rod 111 and the connecting member 112 drive the locking shafts 102 pivoted thereto to move in opposite directions to draw closer to each other and compress the compression springs 104, so that the locking shafts 102 drive the locking pins 105 to exit the locking holes 1013A. When the locking pins 105 completely exit the locking holes 1013A, the connecting rod 112 of the main frame body 101 is driven to move upward. At this time, the transmission members 1013 rotate downward due to the gravity of the cross bar 201 and are engaged with each other to rotate. Finally, the two cross bars 1011 on the two sides are combined respectively, and the handle 106 is released after the entire body rack 101 is completely folded. Definitely, other locking holes 1013A may be opened in the transmission members 1013, so that when the body rack 200 is completely folded, the locking pins 105 penetrate the locking holes 1013A under the restoring forces of the compression springs 104, and thus a locking effect is also achieved when the body rack 200 is folded, which will not be described in detail herein.

In one embodiment, the two shaft sleeves 103 are respectively sleeved on the two locking shafts 102, and the compression springs 104 are respectively sleeved on the locking shafts 102. The locking pins 105 are fixed on one end of each of the locking shafts 102, and the other end of the locking shaft 102 is respectively pivoted on the pulling rod 111 and the connecting member 112. The handle 106 is connected to the tail ends of the pulling rod 111. When the handle 106 is pulled, the handle 106 drives the pulling rod 111 and the connecting member 112 at the same time to make the two locking shafts 102 move in opposite directions to draw closer to each other, so that the locking pins 105 exit the locking holes 1013A, thereby achieving unlocking, and under the effect of the restoring forces of the compression springs 104, automatic locking is also achieved. The structure is simple and compact, and the locking or unlocking effect can be realized by simply pulling or releasing the pulling arm, which is easy to operate.

The sizes and mounting methods of the cross bars 1011, the connecting rod 112, and the transmission members 1013 related to the main frame body 101 locking mechanism 100 according to the present invention are well-known to those of ordinary skill in the art, and will not be described in detail herein.

In another aspect, the present invention relates to a foldable main frame body 200 of a foldable motorized vehicle. As shown in FIG. 6 to FIG. 9, a foldable main frame body 200 according to the present invention is mounted on a front wheel rack 210 and a rear wheel rack 220 of the foldable motorized vehicle to form the foldable main frame body 200. The foldable main frame body 200 includes a plurality of first upper levers 201, a plurality of first lower levers 202, a plurality of second upper levers 203, a plurality of second lower levers 204, a plurality of pivoting members 205, transmission members 206, locking mechanisms 207, connecting members 208 and a fastening mechanism 209. The pivoting member 205 is T-shaped. One end of the first upper lever 201 and one end of the second upper lever 203 respectively have a pivot joint 206. The pivot joints 206 are respectively pivoted to two ends of a horizontal side of the pivoting member 205. The other end of the first upper lever 201 is pivoted to the front wheel rack 201. The other end of the second upper lever 203 is pivoted to the rear wheel rack 220. One end of the first lower lever 202 and one end of the second lower lever 204 are respectively pivoted to a tail end of a vertical side of the pivoting member 205. The other end of the first lower lever 202 is pivoted to the front wheel rack 201. The other end of the second lower lever 204 is pivoted to the rear wheel rack 220. The first lower lever 202 is located below the first upper lever 201. The second lower lever 204 is located below the second upper lever 203. Each of the pivot joints 206 has an arc-shaped edge 2061A. Upper sides of the arc-shaped edges 2061A extend to form protruding blocks 2061B. The protruding blocks 2061B press against each other.

In one embodiment, the foldable main frame body 200 has a plurality of first transmission members 2071 and a plurality of second transmission members 2072. Each of the first transmission members 2071 and the second transmission members 2072 is respectively fixed to the corresponding side of the pivot joints 206. Each of the first transmission members 2071 has a plurality of gear teeth 2071C and each of the second transmission members 2072 has a plurality of gear teeth 2072C. The plurality of gear teeth 2071C are engage with the plurality of gear teeth 2072C, respectively.

In one embodiment, by disposing the transmission members 206 engaging with each other on the pivot joints 206 of the first upper lever 201 and the second upper lever 203, the first upper lever 201 and the second upper lever 203 can be folded or unfolded at the same time, thereby achieving a reliable linkage.

The locking mechanism 207 includes a plurality of locking holes 2071A and 2072A and locking pins (not shown), the locking holes 2071A and 2072A are formed on the first transmission members 2071 and the second transmission members 2072, the two ends of the horizontal side of the pivoting member 205 are formed with openings 205A corresponding to the locking holes 2071A and 2072A, and the locking pins pass through the openings 205A and are inserted into the locking holes 2071A and 2072A, respectively. The locking pins are inserted into the locking holes 2071A and 2072A, so that the foldable main frame body 200 is in a locked state after being unfolded, to prevent loosening at the folded position or accidental folding of the foldable main frame body 200 in use.

One end of the connecting member 208 is pivoted to the pivot joint 206 of the first upper lever 201, and the other end of the connecting member 208 is pivoted to the pivot joint 206 of the second upper lever 203. As the protruding blocks 2061B press against each other when the first upper lever 201 and the second upper lever 203 are completely unfolded. The first upper lever 201 and the second upper lever 203 respectively receive a force, and the pivoting member 205 also receives a large force. Accordingly, the connecting member 208 can effectively enhance the strength at the pivoted position, so as to enable the pivoted position to endure a larger force.

Figure 10:
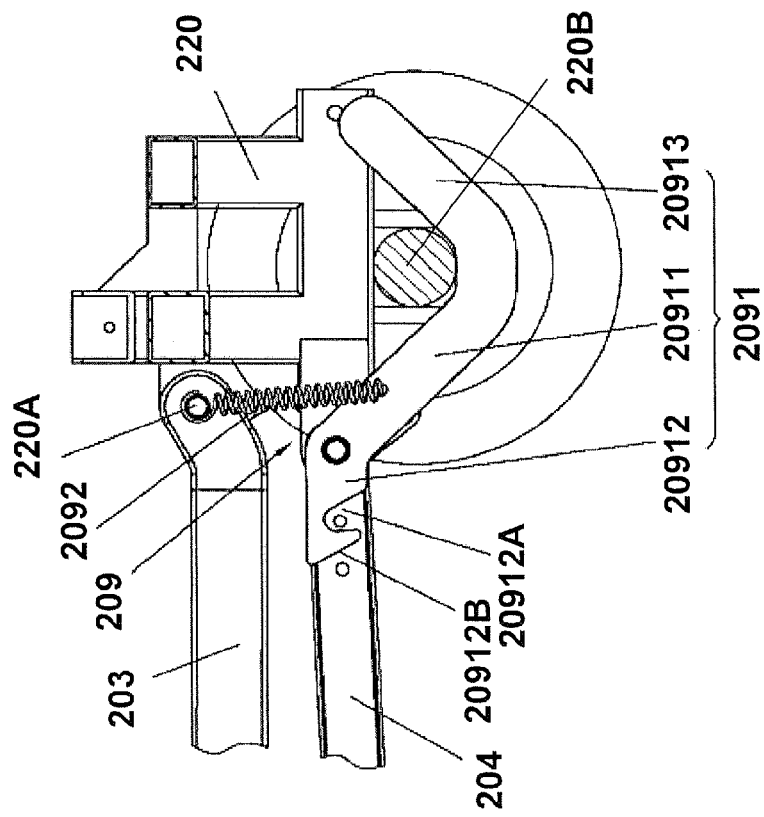
FIG. 10 is a side structural view of a fastening mechanism of a foldable main frame body of an exemplary foldable motorized vehicle according to the present invention.
Figure 9:
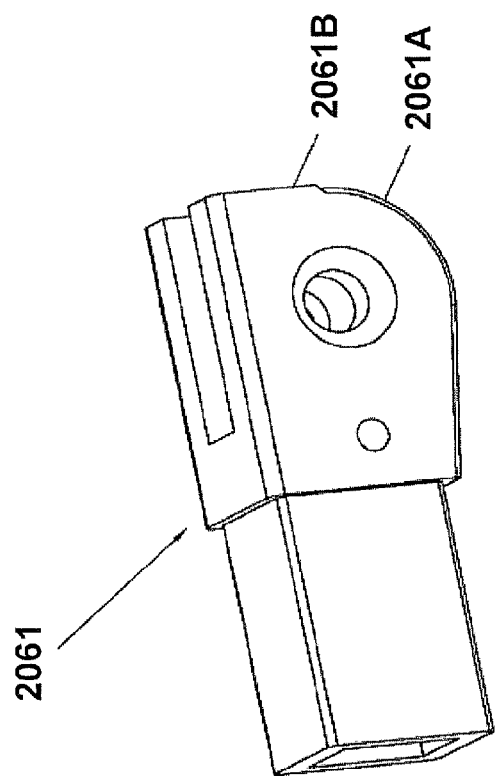
FIG. 9 is a perspective view of a pivot joint of a foldable main frame body of an exemplary foldable motorized vehicle according to the present invention.

As shown in FIG. 10, the fastening mechanism 209 includes a fastening wrench 2091 and a tension spring 2092. The first lower lever 202 is pivoted to the front wheel rack 210 through a front pivot shaft 210A. The second lower lever 204 is pivoted to the rear wheel rack 220 through a rear pivot shaft 220A. The fastening wrench 2091 has a connecting portion 20911. An upper end of the connecting portion 20911 is bent downwards and extends to form a fastening portion 20912, and a lower end of the connecting portion 20911 is bent upwards and extends to form a wrench 20913. The connecting portion 20911 is sleeved over the rear pivot shaft 220A. The fastening portion 20912 is capable of being fastened to the front pivot shaft 210A. The wrench 20913 presses against a rear axle 220B of the rear wheel rack 220. One end of the tension spring 2092 is fixed to the connecting portion 20911, and the other end of the tension spring 2092 is fixed to the rear wheel rack 220. Specifically, the fastening portion 20912 is formed with a slot 20912A facing downwards, and the slot 20912A is capable of fastening the front pivot shaft 210A. A front end of the fastening portion 20912 is formed with a chamfer 20912B facing downwards. When the foldable main frame body 200 is folded, the front pivot shaft 210A presses the chamfer 20912B and pushes away the fastening portion 20912, and after the front pivot shaft 210 arrives at the slot 20912A, the fastening portion 20912 automatically moves downwards to fasten the front pivot shaft 210A under the elastic action of the tension spring 2092, so that automatic locking is achieved after the foldable main frame body 200 is folded, thereby avoiding accidental unfolding.

Figure 11:
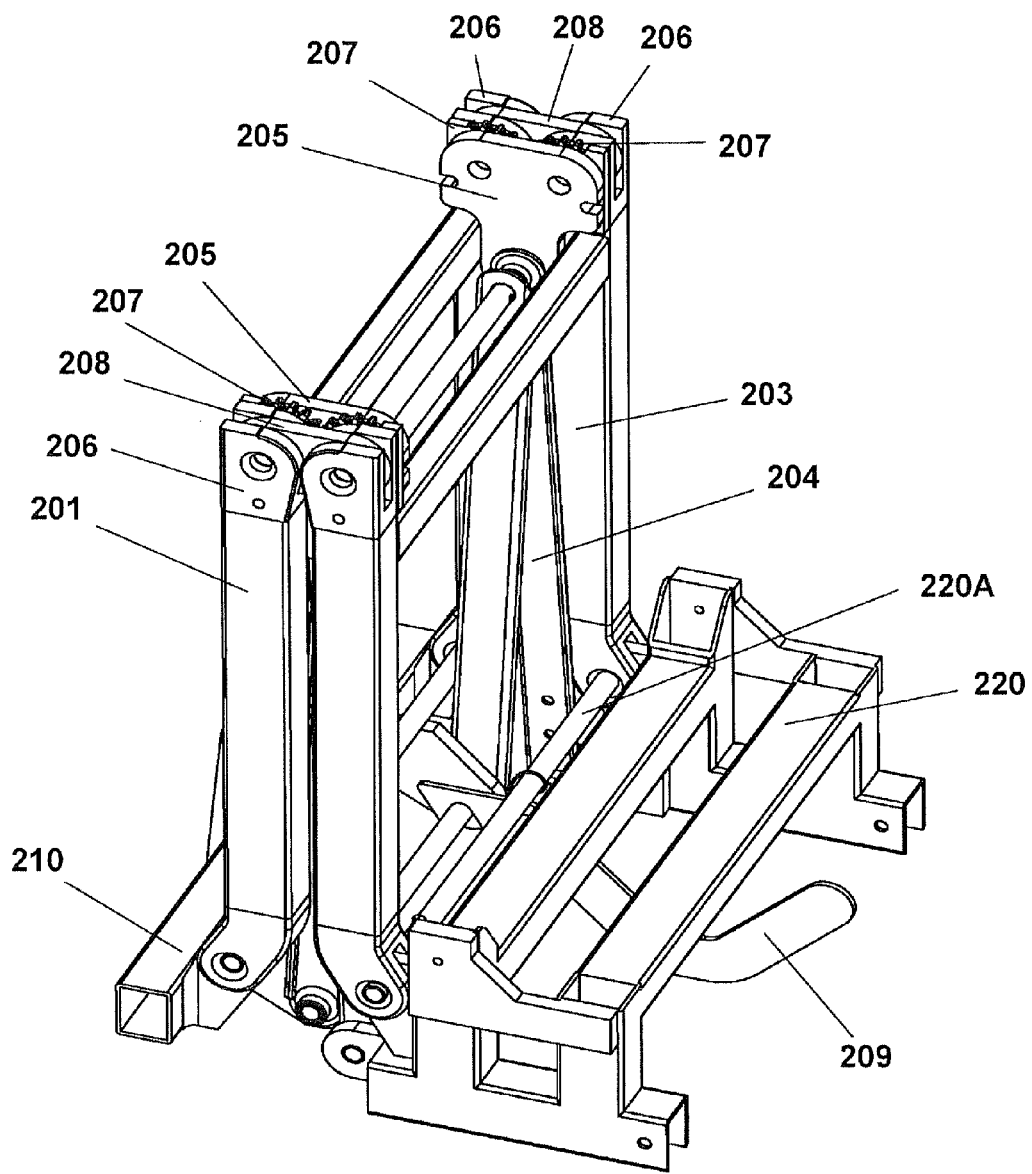
FIG. 11 is a perspective view of a foldable main frame body of an exemplary foldable motorized vehicle when the main frame body is folded according to the present invention.

With reference to the above description as well as FIG. 11, the working principle of the foldable main frame body 200 is described in detail below.

When the foldable main frame body 200 is completely unfolded and bears a load, the first upper lever 201 and the second upper lever 203 are located at the same horizontal position, and the protruding blocks 2061B of the pivot joints 206 press against each other. At this time, the first upper lever 201 and the second upper lever 203 respectively receive a force and apply the force to the pivoting member 205, and the applied forces are counteracted at the pivoting member 205. Meanwhile, the first lower lever 202 and the second lower lever 204 receive a force and pull tight the pivoting member 205 upwards, so that the foldable main frame body 200 formed of two parallelogram racks is in a stable state when bearing a load. The locking pins are inserted into the locking holes 2071A and 2072A to lock the transmission members 206. During folding, when the locking pins are withdrawn from the locking holes 2071A and 2072A, and then the pivoting member 205 is pulled upwards, the first upper lever 201, the first lower lever 202, the second upper lever 203 and the second lower lever 204 rotate downwards about the pivoted position of the pivoting member 205 under the gravity, and meanwhile the gear teeth 2071C and 2072C of the transmission members 206 drive each other to enable the two parallelogram racks to move towards each other, so as to fold the foldable main frame body 200 upwards. When the front pivot shaft 210A moves to the chamfer of the fastening wrench 2091, the front pivot shaft 210A forces the fastening portion 20912 to rotate upwards and drive the connecting portion 20911 to rotate downwards and tension the tension spring 2092. When the front pivot shaft 210A moves to the slot 20912A, the connecting portion 20911 is pulled to rotate upwards under the elastic action of the tension spring 2092, and drives the fastening portion 20912 to rotate downwards. At this time, the slot 20912A fastens the front pivot shaft 210A and the wrench 20913 presses against the rear axle 220B of the rear wheel rack 220, so that the entire foldable main frame body 200 is completely folded and locked. During unfolding, the wrench 20913 is pushed downwards, so that the wrench 20913 drives the fastening portion 20912 to rotate downwards through the connecting portion 20911, and the slot 20912A detaches from the front pivot shaft 210A. At this time, the pivoting member 205 can be pushed downwards, to enable the first upper lever 201, the first lower lever 202, the second upper lever 203 and the second lower lever 204 to rotate about the pivoted position of the pivoting member 205, till the protruding blocks 2061B of the pivot joints 206 press against each other, and the first upper lever 201 and the second upper lever 203 are located at the same horizontal position. Finally, the locking pins are inserted into the locking holes 2017A and 2072A to lock the transmission members 206, thereby completely unfolding the foldable main frame body 200.

Compared with the prior art, in the present invention, the two ends of the first upper lever 201 and the two ends of the first lower lever 202 are pivoted to the front wheel rack 201 and the pivoting member 205, and the two ends of the second upper lever 203 and the two ends of the second lower lever 204 are pivoted to the pivoting member 205 and the rear wheel rack 220, so as to form the foldable main frame body 200 with two parallelogram racks in linkage through the engagement of the transmission members 206, so that once the pivoted position in the middle is pulled upwards, the racks on two sides automatically rotate downwards due to the gravity, thereby achieving folding. Moreover, the protruding blocks 2061B are disposed on the pivot joint 206 at one end of the first upper lever 201 and the pivot joint 206 at one end of the second upper lever 203, and when the foldable main frame body 200 is completely unfolded, the protruding blocks 2061B press against each other, the first upper lever 201 and the second upper lever 203 respectively receive a force and apply the force to the pivoting member 205, and the applied forces are counteracted at the pivoting member 205. Meanwhile, the first lower lever 202 and the second lower lever 204 receive a force and pull tight the pivoting member 205 upwards, so that the foldable main frame body 200 formed of two parallelogram racks is in a stable state when bearing a load, and thus the foldable main frame body 200 can form a stable structure. Furthermore, as the fastening wrench 2091 is disposed on the rear pivot shaft 220 to lock the folded state of the foldable main frame body 200 through the fastening wrench 2091 and the elastic action of the tension spring 2092, accidental unfolding of the foldable main frame body 200 after being folded can be avoided, and the foldable main frame body 200 can be unfolded simply by pressing the wrench 20913 downwards, which is convenient to use. The whole foldable main frame body 200 has a stable structure, is convenient to fold, has a small volume after being folded, greatly saves storage room, and is quite convenient to carry.

The size and mounting method of each lever involved in the foldable main frame body 200 according to the present invention are well known to those of ordinary skill in the art, and will not be illustrated in detail herein.

Figure 12:
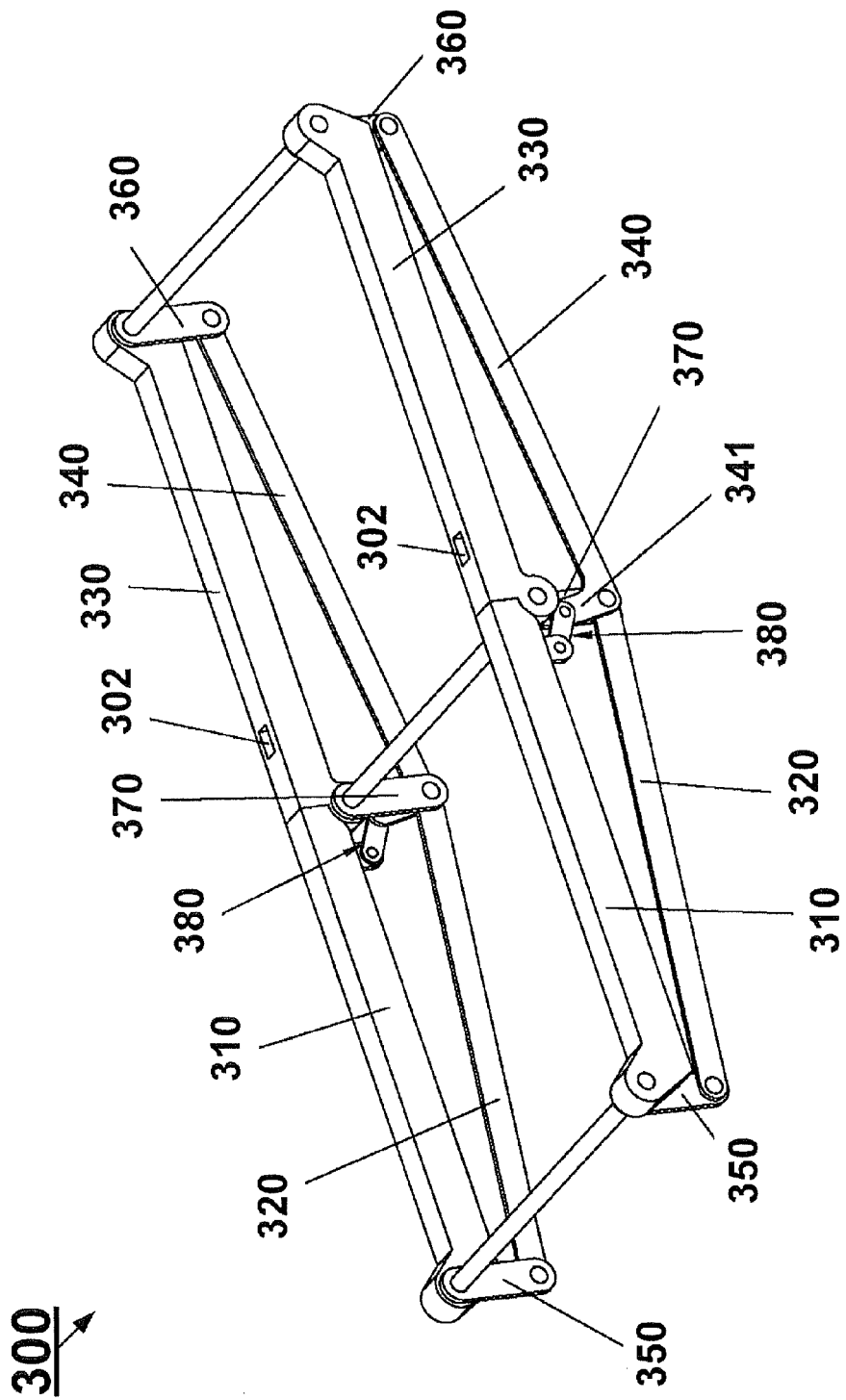
FIG. 12 shows a top perspective structural view of a foldable main frame body of an exemplary foldable motorized vehicle when it is in unfolded position according to one embodiment of the present invention.
Figure 13:
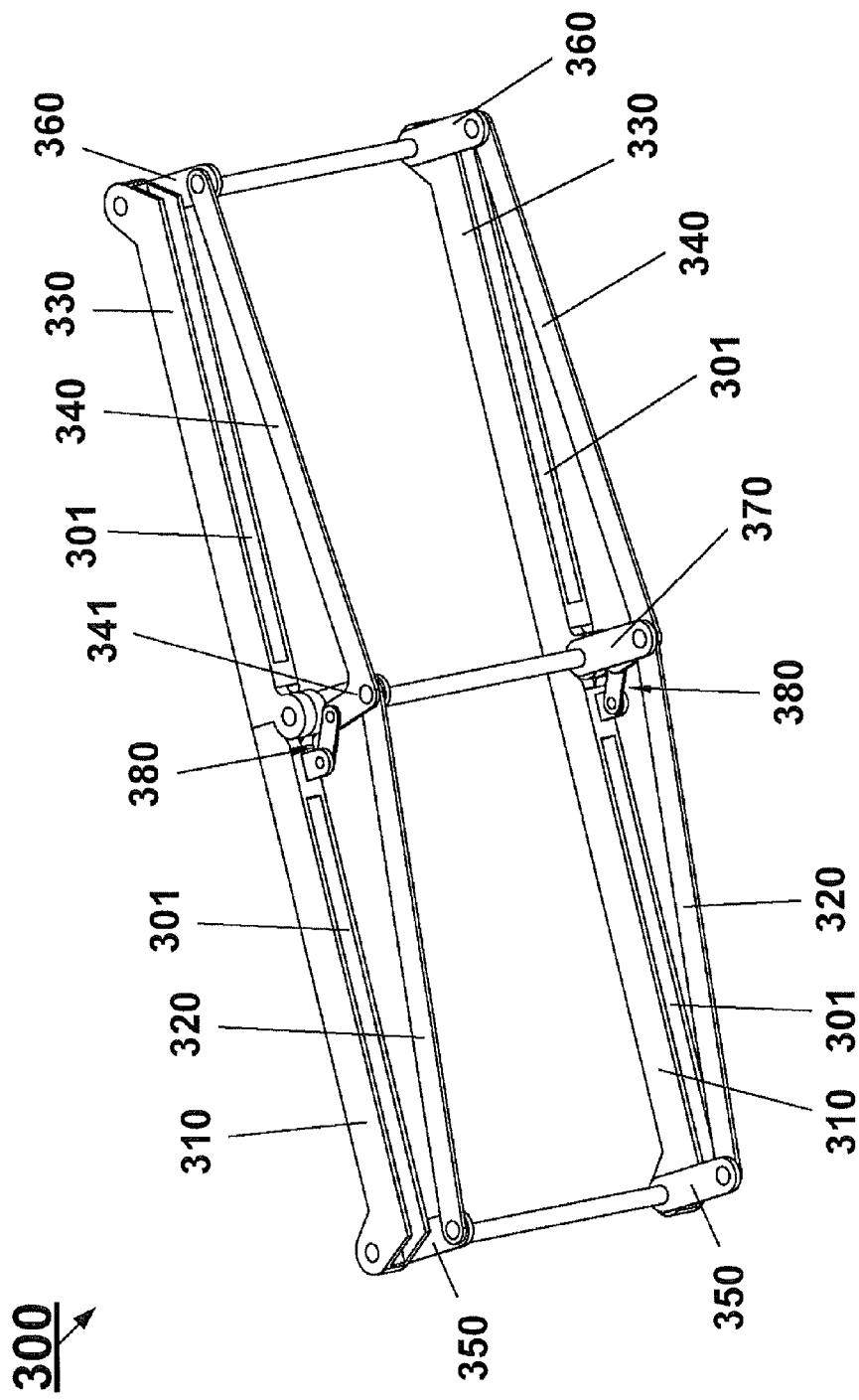
FIG. 13 shows a bottom perspective structural view of the foldable main frame body shown in FIG. 12 according to one embodiment of the present invention.
Figure 14:
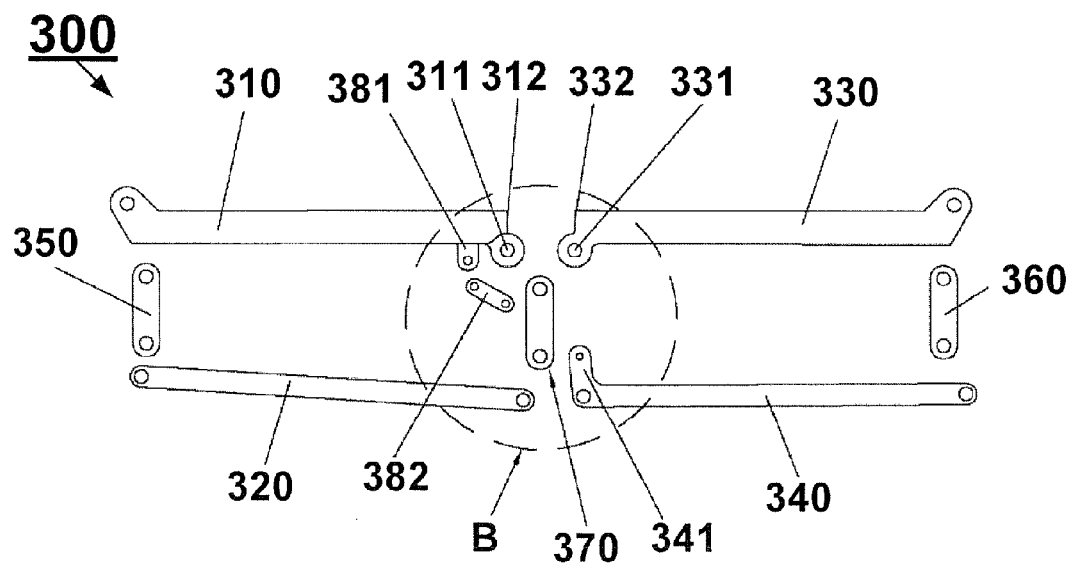
FIG. 14 is a side exploded view of the foldable main frame body of an exemplary foldable motorized vehicle according to one embodiment of the present invention.

The present invention relates to another foldable main frame body 300 of a foldable motorized vehicle. In one embodiment, as shown in FIGS. 12, 13 and 14, foldable main frame body 300 is mounted on a front wheel rack and a rear wheel rack of a foldable motorized vehicle. foldable main frame body 300 includes first upper levers 310, first lower levers 320, second upper levers 330, second lower levers 340, a front lever 350, a rear lever 360, pivoting members 370 and linkage mechanisms 380.

Figure 15:
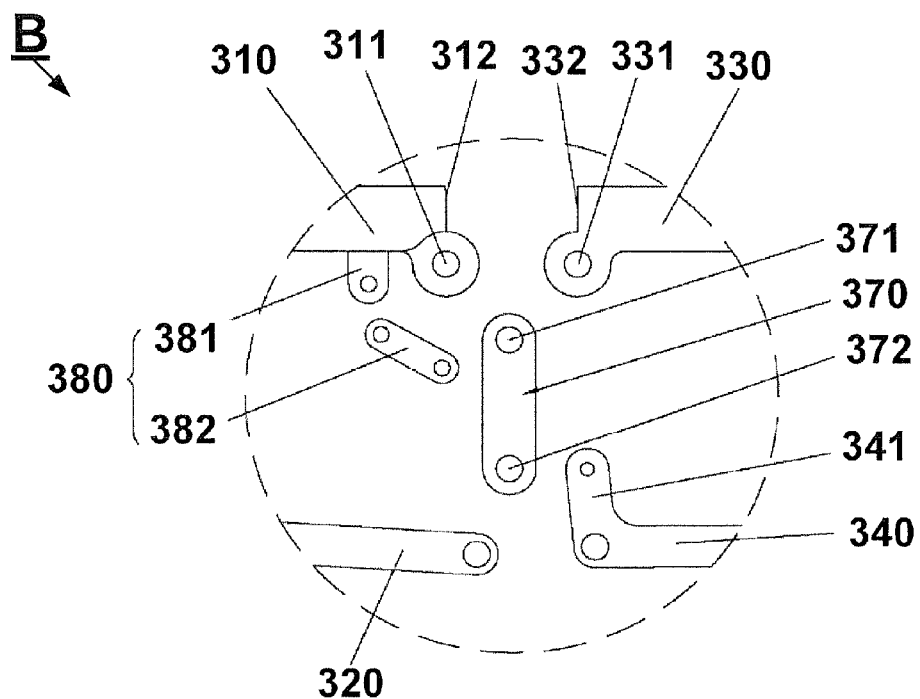
FIG. 15 is an enlarged view of Portion B as shown in FIG. 14 according to one embodiment of the present invention.

As shown in FIG. 15, the pivoting member 370 has an I-shaped structure, an upper end of the pivoting member 370 is formed with an upper pivot hole 371, and a lower end of the pivoting member 370 is formed with a lower pivot hole 372. A front end of the first upper lever 310 and a front end of the first lower lever 320 are respectively pivoted to two ends of the front lever 350. A rear end of the first upper lever 310 and a rear end of the first lower lever 320 are respectively pivoted to the upper pivot hole 371 and the lower pivot hole 372 of the pivoting member 370. A front end of the second upper lever 330 and a front end of the second lower lever 340 are also respectively pivoted to the upper pivot hole 371 and the lower pivot hole 372 of the pivoting member 370. Specifically, one side below the rear end of the first upper lever 310 and the other side below the front end of the second upper lever 330 are formed with corresponding sleeves 311 and 331, one shaft pin passes through the upper pivot hole to pivot the sleeves 311 and 331, and another shaft pin passes through the lower pivot hole 372 to pivot the first lower lever 320 to the second lower lever 340. A rear end of the second upper lever 330 and a rear end of the second lower lever 340 are respectively pivoted to two ends of the rear lever 360. When the foldable main frame body 300 is horizontally unfolded, a rear end surface 312 of the first upper lever 310 presses against a corresponding front end surface 332 of the second upper lever 330.

The pivoted position of the front end of the second lower lever 340 is bent upwards and extends to form a linkage portion 341. The linkage mechanism 380 includes a fixing member 381 and a connecting member 382. The fixing member 381 is fixed to a lower side of the rear end of the first upper lever 310. One end of the connecting member 382 is pivoted to the fixing member 381, and the other end of the connecting member 382 is pivoted to a tail end of the linkage portion 341. As the fixing member 381 is fixed to the lower side of the first upper lever 310, the fixing member 381 rotates along with the first upper lever 310 to push the connecting member 382, so that the connecting member 382 pushes the linkage portion 341 of the second lower lever 340, thereby achieving linkage of the whole folding frame.

A bottom portion of the first upper lever 310 and a bottom portion of the second upper lever 330 are each formed with a groove 301, and the grooves 301 respectively accommodate the first lower lever 320 and the second lower lever 340 during folding. An upper surface of the second upper lever 330 is formed with a through slot 302 in communication with the groove 301, and the through slot 302 accommodates the linkage portion 341 of the second lower lever 340 during folding. When the foldable main frame body 300 is folded, the first lower lever 320 and the second lower lever 340 are accommodated in the grooves 301, so that the foldable main frame body 300 has a more compact structure and takes less space.

Figure 16:
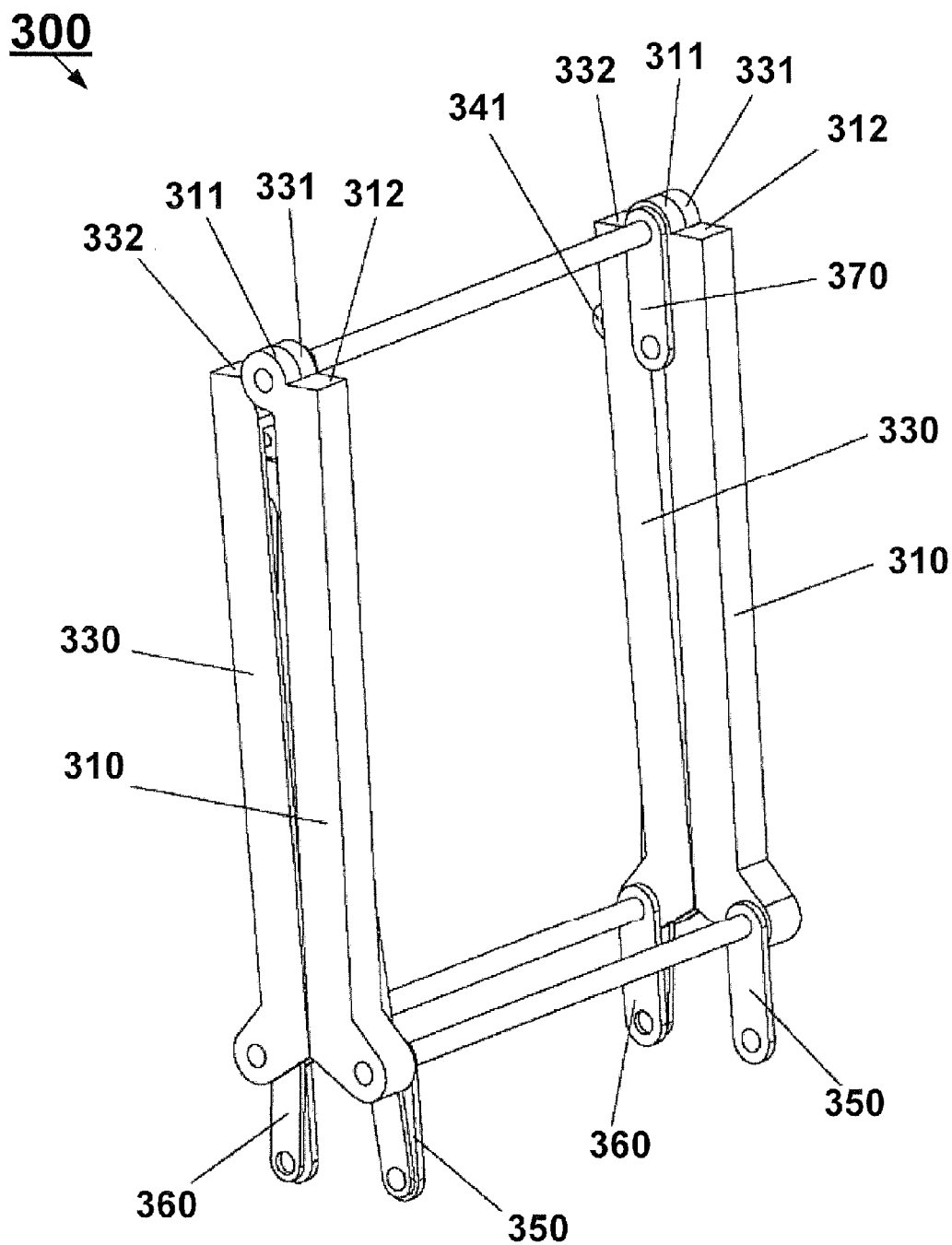
FIG. 16 is a perspective view of a foldable main frame body of an exemplary foldable motorized vehicle when the main frame body is folded according to the present invention.

With reference to the above description and FIG. 16, the working principle of the foldable main frame body 300 according to one embodiment of the present invention is described in detail below.

When the foldable main frame body 300 is completely unfolded and bears a load, the first upper lever 310 and the second upper lever 330 are located at the same horizontal position, and the rear end surface 312 of the first upper lever 310 urges against the front end surface 332 of the second upper lever 330. At this time, the first upper lever 310 and the second upper lever 330 respectively receive a force and apply the force to the pivoting member 370, and the applied forces are counteracted at the pivoting member 370. Meanwhile, the first lower lever 320 and the second lower lever 340 receive a force and pull tight the pivoting member 370 upwards, so that the foldable main frame body 300 formed of two parallelogram racks is in a stable state when bearing a load. When the foldable main frame body 300 needs to be folded, the pivoting member 370 is raised upwards, and the first upper lever 310 and the second upper lever 330 rotate downwards under the gravity, or the first upper lever 310 is rotated, so that the first upper lever 310 rotates downwards about the position where the first upper lever 310 is pivoted to the pivoting member 370, and the first upper lever 310 when rotating downwards drives the first lower lever 320, so as to fold the first lower lever 320 and the front lever 350. Meanwhile, the fixing member 381 of the linkage mechanism 380 rotates about the pivoted position of the first upper lever 310, and drives the connecting member 382 to move, and the other end of the connecting member 382 pushes the linkage portion 341 of the second lower lever 340, to enable the second lower lever 340 to rotate downwards about the position where the second lower lever 340 is pivoted to the pivoting member 370. The second lower lever 340 rotates to drive the second upper lever 330 to rotate downwards, so as to fold the second upper lever 330 and the rear lever 360. Finally, the first upper lever 310 and the second upper lever 330 move towards each other and become parallel, the first lower lever 320 and the second lower lever 340 are accommodated in the grooves 101, and the linkage portion 341 protrudes out of the through slot 302, thereby completely folding the foldable main frame body 300. When the foldable main frame body 300 needs to be unfolded, any one of the levers may be rotated, which drives other levers to rotate through the linkage portion 341 and the linkage mechanism 380, till the foldable main frame body 300 is completely unfolded.

Figure 17:
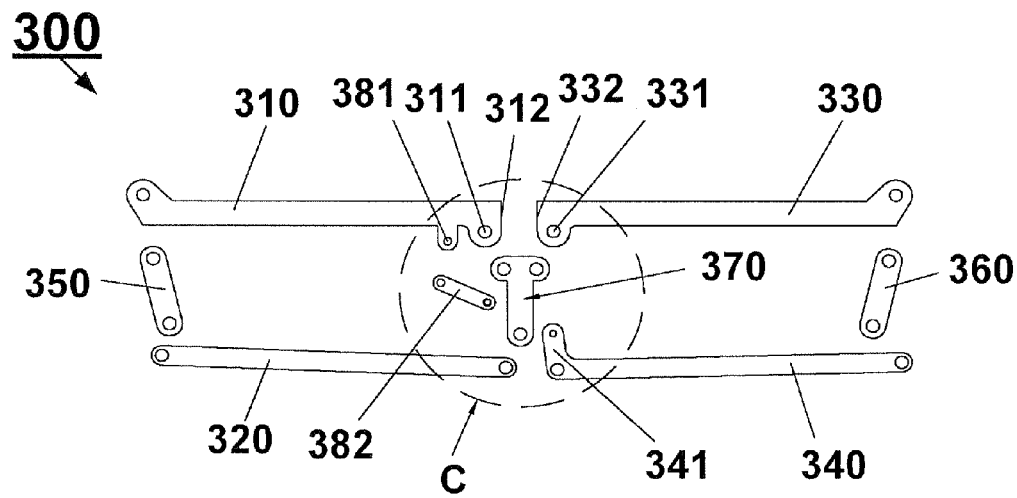
FIG. 17 is a side exploded view of the foldable main frame body of an exemplary foldable motorized vehicle according to one embodiment of the present invention.
Figure 18:
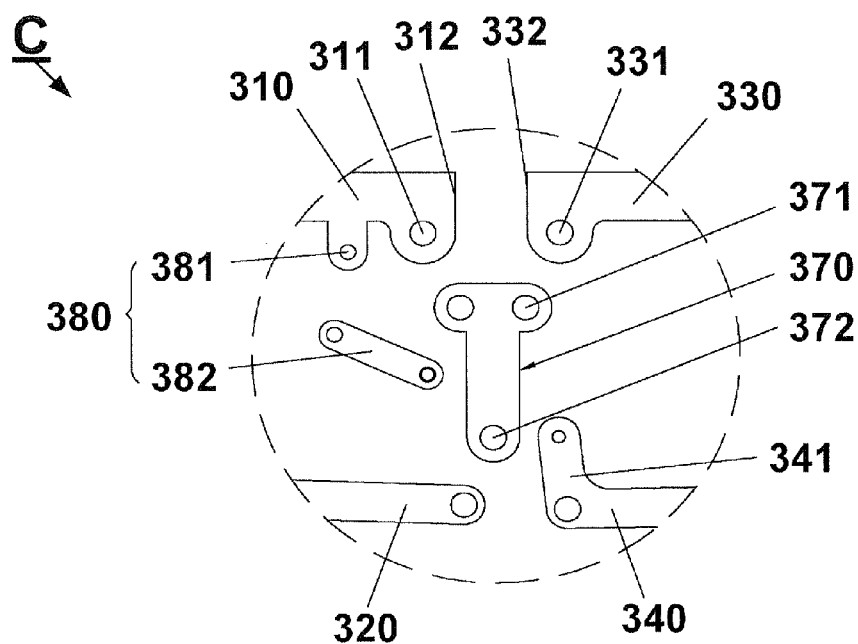
FIG. 18 is an enlarged view of Portion C as shown in FIG. 17 according to one embodiment of the present invention.
Figure 19:
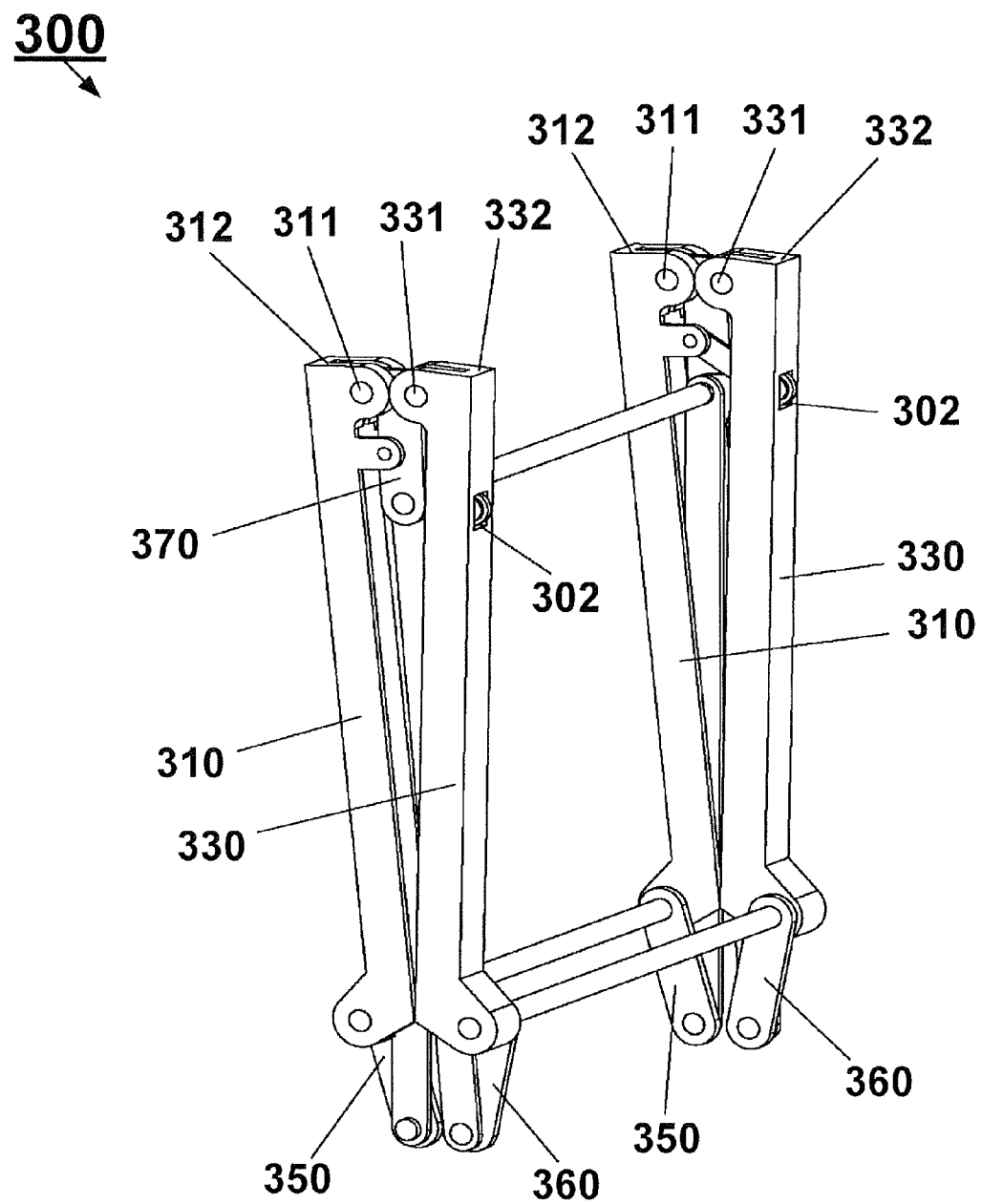
FIG. 19 is a perspective view of a foldable main frame body of an exemplary foldable motorized vehicle when the main frame body is folded according to the present invention.

As shown in FIGS. 17, 18 and 19, a foldable main frame body 300 is shown according to another embodiment of the present invention. In this embodiment, the foldable main frame body 300 includes first upper levers 310, first lower levers 320, second upper levers 330, second lower levers 340, a front lever 350, a rear lever 360, pivoting members 370 and linkage mechanisms 380.

The pivoting member 370 has a T-shaped structure, two top ends of the pivoting member 370 are respectively formed with an upper pivot hole 371, and the lower end of the pivoting member 370 is formed with a lower pivot hole 372. A front end of the first upper lever 310 and a front end of the first lower lever 320 are respectively pivoted to two ends of the front lever 350. A rear end of the first upper lever 310 is pivoted to one pivot hole 271 at one end of the upper side of the pivoting member 370. A rear end of the first lower lever 320 is pivoted to the lower pivot hole 372 of the pivoting member 370. A front end of the second upper lever 330 is pivoted to the other upper pivot hole 371 on the upper side of the pivoting member 370. A front end of the second lower lever 340 is pivoted to the lower pivot hole 372 of the pivoting member 370.

As shown in FIG. 17 and FIG. 18, specifically, the rear end of the first upper lever 310 and the front end of the second upper lever 330 respectively have pivot joints 311 and 331, shaft pins pass through the two upper pivot holes 371 to respectively pivot the pivot joints 311 and 331 to the two ends of the upper side of the pivoting member 370, and another shaft pin passes through the lower pivot hole 372 to pivot the first lower lever 320 to the second lower lever 340. The rear end of the second upper lever 330 and the rear end of the second lower lever 340 are respectively pivoted to two ends of the rear lever 360. When the foldable main frame body 300 is horizontally unfolded, a rear end surface 312 of the first upper lever 310 presses against a corresponding front end surface 332 of the second upper lever 330.

The pivoted position of the front end of the second lower lever 340 is bent upwards and extends to form a linkage portion 341. The linkage mechanism 380 includes a fixing member 381 and a connecting member 382. The fixing member 381 is fixed to a lower side of the rear end of the first upper lever 310. One end of the connecting member 382 is pivoted to the fixing member 381, and the other end of the connecting member 382 is pivoted to a tail end of the linkage portion 341. Through the connection of the linkage mechanism 380 and the linkage portion 341, linkage of the foldable main frame body 300 is achieved.

As shown in FIG. 19, a bottom portion of the first upper lever 310 and a bottom portion of the second upper lever 330 are each formed with a groove 301, and the grooves 301 respectively accommodate the first lower lever 320 and the second lower lever 340 during folding. Specifically, an upper surface of the second upper lever 330 is formed with a through slot 302 in communication with the groove 301, and the through slot 302 accommodates the linkage portion 341 of the second lower lever 340 during folding.

The second embodiment is different from the foldable main frame body 300 of the first embodiment only in the structure of the pivoting member 370 and the method for pivoting the pivoting member 370 to the first upper lever 210 and the second upper lever 330, and has the same working principle as the first embodiment, so that the details will not be described herein again.

Compared with the prior art, in the first embodiment of the present invention, the two ends of the first upper lever 310 and the two ends of the first lower lever 320 are pivoted to the front lever 350 and the pivoting member 370, and the two ends of the second upper lever 330 and the two ends of the second lower lever 340 are pivoted to the pivoting member 370 and the rear lever 360, so as to form the foldable main frame body 300 with two parallelogram racks, in which the rear end surface 312 of the first upper lever 310 urges against the front end surface 332 of the second upper lever 330 when the foldable main frame body 300 is completely unfolded, so that the foldable main frame body 300 formed of two parallelogram racks is in a stable state when bearing a load. Moreover, as one end of the second lower lever 340 extends to form a linkage portion 341, and the linkage portion 341 is connected to the linkage mechanism 380 mounted on the first upper lever 310, the first upper lever 310 when rotating can drive the second lower lever 340 and the second upper lever 330 at the same time, so as to fold or unfold the whole foldable main frame body 300. Furthermore, as the bottom surfaces of the first upper lever 310 and the second upper lever 330 are formed with the grooves 301, the first lower lever 320 and the second lower lever 340 can be accommodated in the grooves 301, so that the foldable main frame body 300 has a more compact structure after being folded, which saves space. The whole foldable main frame body 300 has a stable structure and can be folded through linkage simply by rotating any one of the levers. The whole folding frame is convenient to fold, has a small volume after being folded, greatly saves storage room, and is quite convenient to carry.

The size and mounting method of each lever involved in the folding frame according to the present invention are well known to those of ordinary skill in the art, and will not be illustrated in detail herein.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A locking mechanism for a foldable motorized vehicle for locking a main frame body thereof, comprising:
   (a) a pulling arm;
   (b) a plurality of locking shafts;
   (c) a plurality of shaft sleeves;
   (d) a plurality of elastic elements; and
   (e) a plurality of locking pins,
   wherein the plurality of shaft sleeves is fixedly positioned in parallel below the main frame body, the plurality of the shaft sleeves is respectively sleeved on the plurality of locking shafts, the main frame body comprises a plurality of locking holes, the plurality of locking pins each is fixed on one end of a corresponding one of the plurality of locking shafts and penetrates the corresponding locking holes, the plurality of elastic elements is sleeved on the corresponding locking shaft, and has one end pressing against one end of the locking shaft and the other end pressing against a side surface of the corresponding shaft sleeve, respectively, the pulling arm comprises a pulling rod and a connecting member, one end of the pulling rod is pivoted on one end of one locking shaft, one end of the connecting member is pivoted on one end of the other locking shaft, and the other end of the connecting member is pivoted on the pulling rod.

2. The locking mechanism according to claim 1, wherein the locking shafts respectively have one fixing arm extending from a left side and a right side at one end, and the locking pins are respectively fixed on two ends of the fixing arm.

3. The locking mechanism according to claim 1, further comprising a handle having a first side connecting member and a second side connecting member, each of the first side connecting member and the second side connecting member connecting to tail ends of the pulling rod.

4. The locking mechanism according to claim 3, wherein a plurality of moving slots is respectively opened on side surfaces of the handle, and the tail ends of the pulling rod are movably connected to the plurality of moving slots.

5. The locking mechanism according to claim 1, wherein the plurality of elastic elements comprises compression spring.

6. A foldable motorized vehicle comprising the locking mechanism of claim 1.

7. A foldable main frame body, mounted on a front wheel rack and a rear wheel rack of a foldable motorized vehicle, comprising:
(a) a plurality of first upper levers;
(b) a plurality of first lower levers;
(c) a plurality of second upper levers;
(d) a plurality of second lower levers; and
(e) a plurality of pivoting members,
wherein one end of each first upper lever and one end of each second upper lever respectively have a pivot joint, the pivot joints are respectively pivoted to two ends of upper side of one corresponding pivoting member, the other end of the first upper lever and the other end of the second upper lever are pivoted to the front wheel rack and the rear wheel rack, respectively, one end of the first lower lever and one end of the second lower lever are pivoted to two sides of lower end of the one corresponding pivoting member, respectively, the other end of the first lower lever and the other end of the second lower lever are pivoted to the front wheel rack and the rear wheel rack, respectively, the first lower lever is located below the first upper lever, the second lower lever is located below the second upper lever, each of the pivot joints has an arc-shaped edge, upper sides of the arc-shaped edges extend to form opposite protruding blocks, and when the main frame body is level, the protruding blocks press against each other.

8. The foldable main frame body according to claim 7, wherein the foldable main frame body further comprises a plurality of first transmission members and a plurality of second transmission members, wherein each of the first transmission members and the second transmission members is respectively fixed to the corresponding side of the pivot joints, and each of the first transmission members comprises gear teeth and each of the second transmission members comprises gear teeth, and the gear teeth of the first transmission members are engage with gear teeth of the second transmission members, respectively.

9. The foldable main frame body according to claim 8, wherein the foldable main frame body further comprises a plurality of locking mechanisms, each of the plurality of locking mechanism comprises a locking hole and locking pin, the locking hole is formed on the transmission member, two ends of a horizontal side of the pivoting member are formed with openings, and the locking pins pass through the openings and are inserted into the locking holes.

10. The foldable main frame body according to claim 7, wherein the foldable main frame body further comprises connecting members, one end of the connecting member is pivoted to the pivot joint of the first upper lever, and the other end of the connecting member is pivoted to the pivot joint of the second upper lever.

11. The foldable main frame body according to claim 7, wherein the foldable main frame body further comprises a fastening mechanism, the fastening mechanism comprises a fastening wrench and an elastic element, the first lower lever is pivoted to the front wheel rack through a front pivot shaft, the second lower lever is pivoted to the rear wheel rack through a rear pivot shaft, the fastening wrench has a connecting portion, an upper end of the connecting portion is bent downwards and extends to form a fastening portion, a lower end of the connecting portion is bent upwards and extends to form a wrench, the connecting portion is sleeved over the rear pivot shaft, the fastening portion is capable of being fastened to the front pivot shaft, the wrench presses against a rear axle of the rear wheel rack, one end of the elastic element is fixed to the connecting portion, and the other end of the elastic element is fixed to the rear wheel rack.

12. The foldable main frame body according to claim 11, wherein the fastening portion is formed with a slot facing downwards, and the slot is capable of fastening the front pivot shaft.

13. The foldable main frame body according to claim 12, wherein a front end of the fastening portion is formed with a chamfer facing downwards.

14. The foldable main frame body according to claim 13, wherein the elastic element is a tension spring.

15. A foldable motorized vehicle comprising the foldable main frame of claim 7.

16. A foldable main frame body of a foldable motorized vehicle, comprising:
(a) a plurality of first upper levers;
(b) a plurality of first lower levers;
(c) a plurality of second upper lever;
(d) a plurality of second lower levers;
(e) a front lever;
(f) a rear lever;
(g) a plurality of pivoting members; and
(h) a plurality of linkage mechanisms,
wherein a front end of the first upper lever and a front end of the first lower lever are respectively pivoted to two ends of a front lever, a rear end of the first upper lever and a rear end of the first lower lever are respectively pivoted to an upper end and a lower end of a pivoting member, a front end of the second upper lever and a front end of the second lower lever are respectively pivoted to the upper end and the lower end of a pivoting member, a rear end of the second upper lever and a rear end of the second lower lever are respectively pivoted to two ends of a rear lever, a rear end surface of the first upper lever presses against a front end surface of the second upper lever when the folding frame is horizontally unfolded, the pivoted position of the front end of the second lower lever is bent upwards and extends to form a linkage portion, one end of the linkage mechanism is fixed to the first upper lever, and the other end of the linkage mechanism is pivoted to a tail end of the linkage portion.

17. The foldable main frame body according to claim 16, wherein each of the plurality of the linkage mechanisms comprises a fixing member and a connecting member, the fixing member is fixed to a lower side of the rear end of the first upper lever, one end of the connecting member is pivoted to the fixing member, and the other end of the connecting member is pivoted to the tail end of the linkage portion.

18. The foldable main frame body according to claim 16, wherein a bottom portion of the plurality of the first upper levers and a bottom portion of the plurality of the second upper levers are each formed with a groove, and the grooves respectively accommodate the plurality of the first lower levers and the plurality of the second lower levers during folding, respectively.

19. The foldable main frame body according to claim 18, wherein an upper surface of each of the plurality of the second upper levers is formed with a through slot in communication with the groove, and the through slot accommodates the linkage portion of the plurality of the second lower levers during folding, respectively.

20. The foldable main frame body according to claim 16, wherein each of the plurality of the pivoting members has an I-shaped structure, an upper end of the pivoting member is formed with an upper pivot hole, and a lower end of the pivoting member is formed with a lower pivot hole.

21. The foldable main frame body according to claim 20, wherein one side below the rear end of the first upper lever and the other side below the front end of the second upper lever are formed with corresponding sleeves, a shaft pin passes through the upper pivot hole to pivot the sleeves, and another shaft pin passes through the lower pivot hole to pivot the first lower lever to the second lower lever.

22. The folding main frame according to claim 18, wherein each of the plurality of the pivoting members has a T-shaped structure, each of two top ends of the pivoting member is respectively formed with an upper pivot hole, and a lower end of the pivoting member is formed with a lower pivot hole.

23. The folding main frame according to claim 22, wherein the rear end of the first upper lever and the front end of the second upper lever respectively have pivot joints, shaft pins pass through the upper pivot holes to respectively pivot the pivot joints to the two top ends of the pivoting member, and another shaft pin passes through the lower pivot hole to pivot the first lower lever to the second lower lever.

24. A foldable motorized vehicle comprising the foldable main frame of claim 16.

* * * * *